(12) United States Patent
Prunet et al.

(10) Patent No.: US 11,667,374 B2
(45) Date of Patent: Jun. 6, 2023

(54) BLADE PITCH ACTUATION MECHANISM

(71) Applicant: Ratier-Figeac SAS, Figeac (FR)

(72) Inventors: Ludovic Prunet, Themines (FR); Patrick Moles, Corn (FR); Kevin Le Meur, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 17/201,012

(22) Filed: Mar. 15, 2021

(65) Prior Publication Data
US 2021/0284324 A1    Sep. 16, 2021

(30) Foreign Application Priority Data
Mar. 16, 2020 (EP) .................................... 20305268

(51) Int. Cl.
  *B64C 11/44*    (2006.01)
  *B64C 11/36*    (2006.01)
  *B64C 11/06*    (2006.01)

(52) U.S. Cl.
  CPC .............. *B64C 11/44* (2013.01); *B64C 11/06* (2013.01); *B64C 11/36* (2013.01)

(58) Field of Classification Search
  CPC ......... B64C 11/06; B64C 11/30; B64C 11/36; B64C 11/42; B64C 11/44; B64C 27/54; F01D 7/00; F05D 2230/64; F05D 2260/56
  USPC ........................................................ 416/147
  See application file for complete search history.

(56) References Cited

U.S. PATENT DOCUMENTS

| | | | |
|---|---|---|---|
| 1,891,384 A * | 12/1932 | Gillis ...................... | B64C 11/36 416/167 |
| 2,028,463 A * | 1/1936 | McDougall ............. | B64C 11/36 416/152 |
| 2,953,208 A * | 9/1960 | O'Connor ................ | B63H 3/12 416/207 |
| 4,124,330 A | 11/1978 | Barnes | |
| 5,199,850 A | 4/1993 | Carvalho et al. | |
| 5,205,712 A * | 4/1993 | Hamilton .............. | F04D 29/323 416/162 |
| 5,595,474 A | 1/1997 | Girard | |
| 5,795,132 A * | 8/1998 | Wheeler ................. | B64C 11/34 416/155 |
| 6,672,835 B1 | 1/2004 | Hughes | |
| 7,296,969 B2 | 11/2007 | Raes et al. | |
| 8,529,205 B2 | 9/2013 | Perkinson | |
| 9,677,408 B2 | 6/2017 | Tajan et al. | |
| 9,758,245 B2 | 9/2017 | Ries | |
| 10,476,360 B2 | 11/2019 | Hunter et al. | |
| 2014/0322016 A1 * | 10/2014 | Tajan ...................... | B64C 11/32 416/147 |

(Continued)

FOREIGN PATENT DOCUMENTS

EP    3241743 A1    11/2017

OTHER PUBLICATIONS

Extended European Search Report for International Application No. 20305268.3 dated Oct. 19, 2020, 9 pages.

*Primary Examiner* — Christopher Verdier
(74) *Attorney, Agent, or Firm* — Cantor Colburn LLP

(57) ABSTRACT

A blade pitch actuation mechanism comprising a rotating race member in which is formed a race configured to receive a trunnion pin attached to a blade, whereby the race defines a cam profile such that rotation of the race member causes the trunnion pin received in the race to rotate as it slides over the cam profile.

5 Claims, 6 Drawing Sheets

(56) References Cited

U.S. PATENT DOCUMENTS

2016/0333709 A1* 11/2016 Belmonte ................. F01D 7/00
2019/0118941 A1    4/2019 Iskrev et al.
2021/0062661 A1*  3/2021 Loos ....................... F03B 3/128

* cited by examiner

BLADE PITCH ACTUATION MECHANISM

FOREIGN PRIORITY

This application claims priority to European Patent Application No. 20305268.3 filed Mar. 16, 2020, the entire contents of which is incorporated herein by reference.

TECHNICAL FIELD

The present disclosure relates to blade pitch actuation mechanisms such as for aircraft propeller blades.

BACKGROUND

Rotating propellers are used in a variety of mechanical applications. Many aircraft, for example, use turboprop engines in which a turbine is used to drive propeller blades to produce propulsive thrust. The pitch of the propeller blades is varied to change engine power output and the blade pitch is controlled by a blade pitch actuation mechanism. In an aircraft, the blade pitch needs to be adjusted differently for different flight conditions and stages of flight.

Typically, each propeller blade is connected to the blade pitch actuation mechanism by a trunnion pin and bearing assembly which is configured to counter the rotational torque imparted to the blade by the airstream and rotating forces generated by the mass distribution of the blade itself.

The blade pitch actuation mechanism is usually located in the propeller hub about which the blades are mounted. A hydraulic actuator is used to adjust the pitch of the blades to obtain the desired thrust.

A convention blade pitch actuation mechanism has several blades attached to a yoke by means of a respective offset trunnion pin. An actuator such as a hydraulic piston is controlled to move the yoke to change the pitch of the blades. The trunnion pins are received by the yoke at one end and are attached to their respective blades at the other end. As the yoke moves axially due to the actuator, the trunnion pins are rotated in an arcuate manner to cause pitch change. Because the trunnion pins are offset relative to the blade axes, axial movement of the yoke, caused by the actuator, results in rotation of the blades about a change axis—i.e. the pitch of the blades changes.

U.S. Pat. No. 5,199,850 teaches a blade pitch actuation mechanism where pitch change is effectuated by a ballscrew and ballscrew nut assembly that is responsive to a mechanical differential gearing that imports rotary motion to the ballscrew that, in turn, translates the ballscrew nut. The ballscrew nut is attached to the root of the propeller blade through a yoke, trunnion and a connecting link for increasing and decreasing the pitch of the blade. A similar system is taught in U.S. Pat. No. 7,296,969 and in U.S. Pat. No. 8,529,205. EP 3241743 teaches a blade pitch actuation mechanism in which the pitch of the blades can be individually adjusted.

All of these systems involve a translation from the linear motion of the hydraulic actuator piston and the yoke to the rotary motion of the trunnion pins and the blades. This gives rise to the need for a pitch lock or feathering system to avoid the movement being reversed due to the airstream acting on the blades especially in the case of loss of pressure in the hydraulic system.

Also, hydraulic systems are prone to leaks and require additional seals. The use of hydraulic fluid pressure also introduces an inherent response delay.

Recently, there has been a move to a more electric aircraft (MEA) where mechanical or hydraulic systems are supported or replaced by electrical systems.

There is a need for a blade pitch actuation mechanism that addresses these issues.

SUMMARY

According to one aspect, there is provided a blade pitch actuation mechanism comprising a rotating race member in which is formed a race configured to receive a trunnion pin attached to a blade, whereby the race defines a cam profile such that rotation of the race member causes the trunnion pin received in the race to rotate as it slides over the cam profile.

According to another aspect, there is provided a method of adjusting the pitch of a blade in a propeller system, the method comprising rotating a cam in which a trunnion pin attached to the blade is slidingly received about an axis of rotation of the propeller system, the cam profile being such as to rotate the trunnion pin about its own axis as the cam rotates.

A propeller system is also taught.

In one embodiment, the cam profile of any prior embodiment is ovoid, which allows the system to be simplified.

In a preferred embodiment, the race member in any prior embodiment is driven by an electric drive. This may be mounted on a rotating part of the propeller assembly.

BRIEF DESCRIPTION OF THE DRAWINGS

Embodiments will now be described, by way of example only, with reference to the drawings.

DETAILED DESCRIPTION

The described embodiments are by way of example only. The scope of this disclosure is limited only by the claims.

Figure 1:
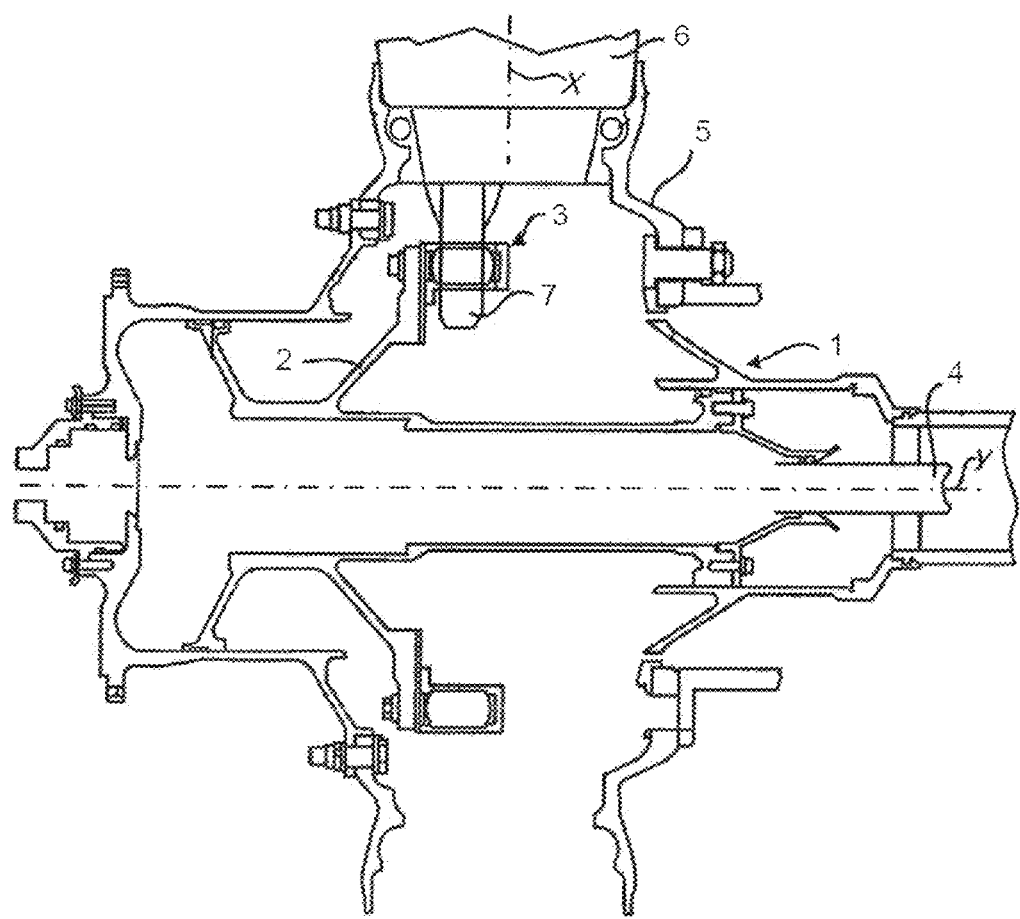
FIG. 1 is a schematic view of a known blade pitch actuation mechanism.
Figure 2:
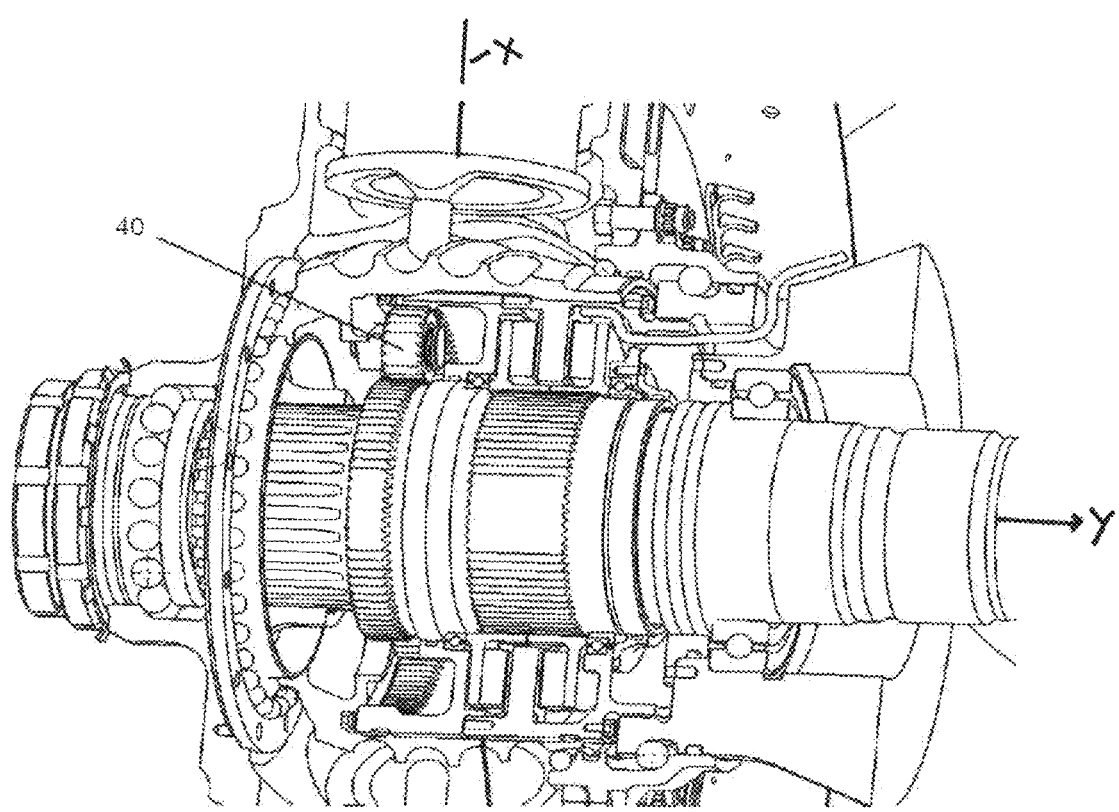
FIG. 2 is a part-sectional view of a blade pitch actuation mechanism according to the disclosure.

Referring first to FIG. 1, a conventional blade pitch actuation mechanism is shown.

The blade pitch actuation mechanism includes a hydraulic actuator 1 comprising a yoke 2, and also includes a bearing assembly 3. Output shaft 4 extending from the engine gearbox (not shown) is connected to the propeller hub 5. The propeller blades 6 are attached to the hub via a bearing to which is attached a trunnion pin 7 that is rotatably linked to the yoke 2.

In operation, the propeller, including the hub 5, blades and yoke, is driven to rotate about axis Y which rotates the blades 6 about axis Y, reacting with the airstream.

The operation of the hydraulic mechanism is known and will not be described in detail but, in short, adjustments to hydraulic pressure will cause translation of the yoke 2 along axis Y. As the yoke moves along axis Y, it causes rotation of the trunnion pin 7 around axis X, thereby changing the pitch of the blade 6.

The bearing assembly 3 is configured to transfer the forces applied to the trunnion pin to act against the tendency of the blade to rotate under the force of the airstream/its own weight.

The blade pitch actuation mechanism of the present disclosure will now be described with reference to FIGS. 2 to 5.

As with conventional systems, the propeller comprises a number of blades 10 mounted about a hub 12. The inner end 14 of each blade is received in a coupling 16 to which is mounted a trunnion pin 18. Rotation of the trunnion pin 18 causes rotation, or pitch change, of the blade 10.

A rotatable race member 20 is mounted within the hub and a race 22 is formed in this member, in which the trunnion pins 18 are received.

The race 22 forms a cam profile such that as the race rotates about axis Y, the trunnion pins 18 slide along the cam causing the blades to change pitch relative to the X axis.

Figure 3A:
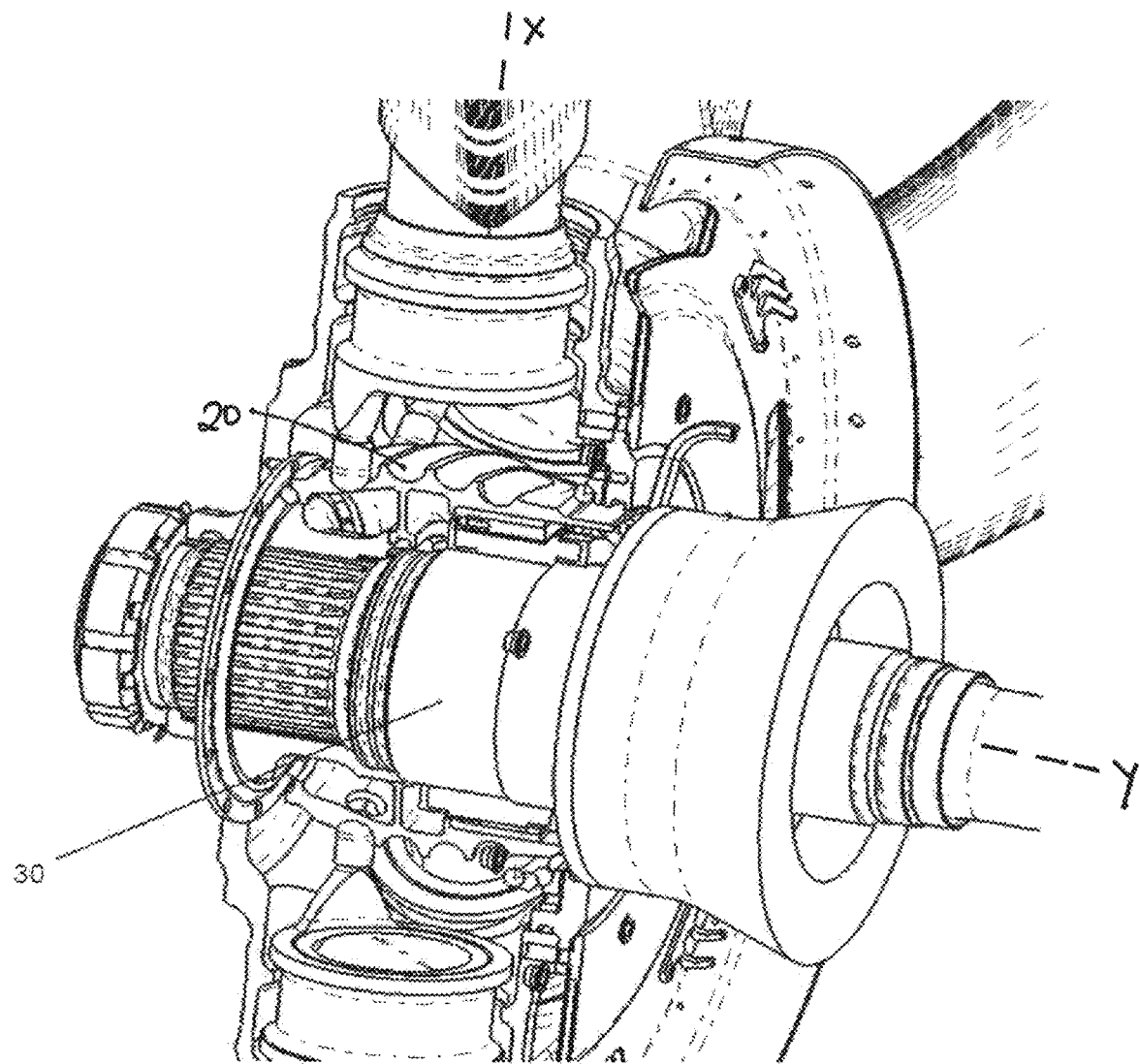
FIGS. 3A to 3C show different stages of movement of the components of the blade pitch actuation mechanism of FIG. 2 during pitch adjustment.
Figure 3B:
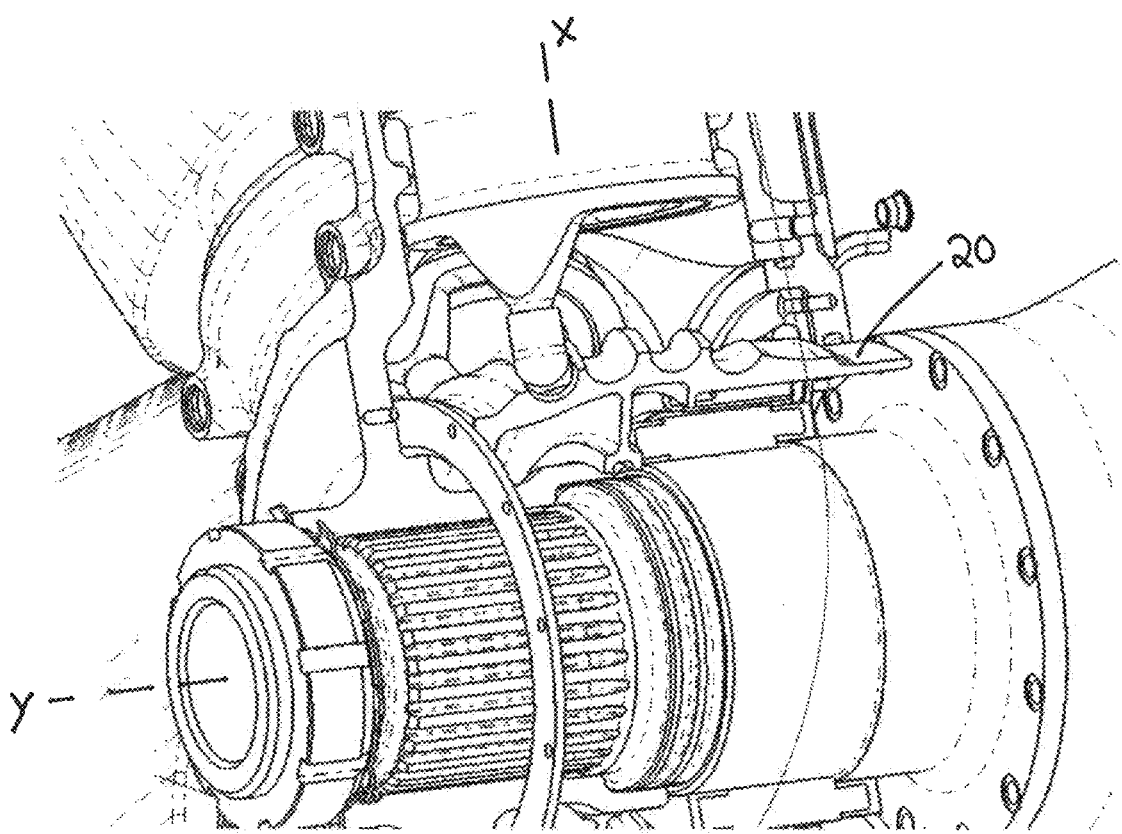
Figure 3C:
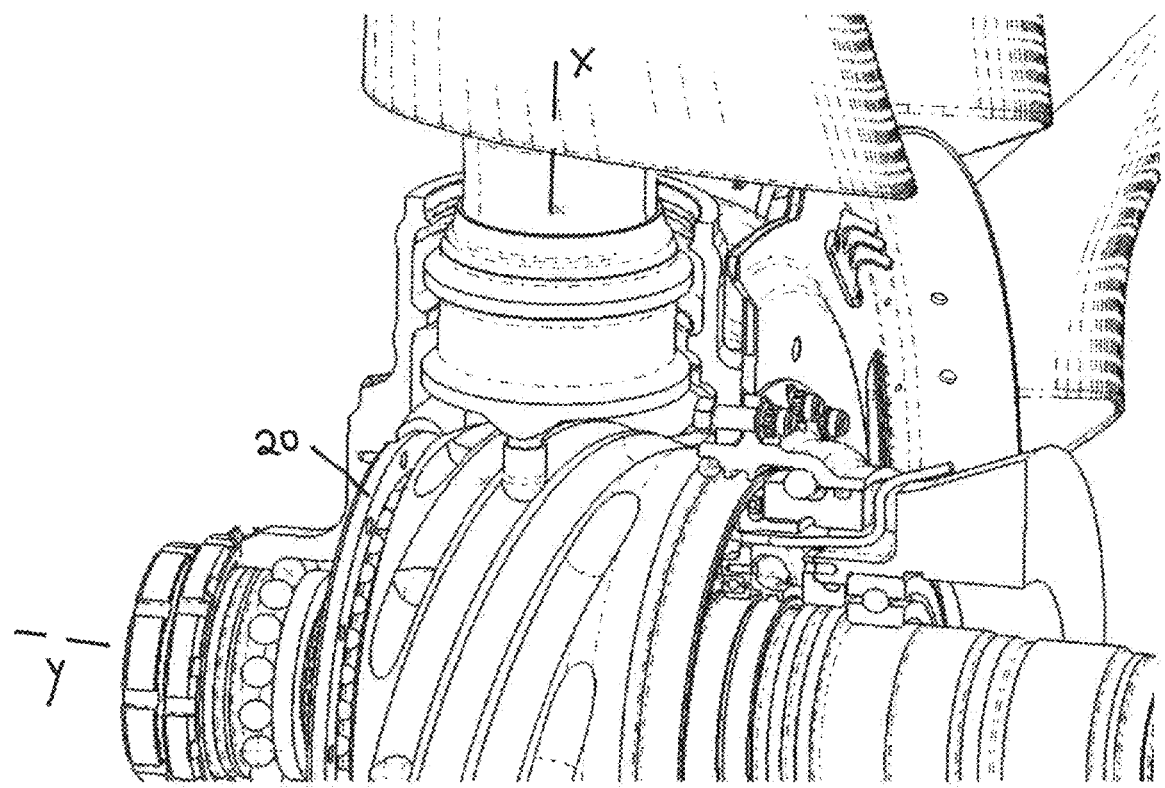

FIGS. 3A to 3C show how the trunnion pins 18 and, thus, the blades 10 rotate as the race member cam rotates.

The race member 20 rotates together with, and at the same speed as the hub propeller shaft 30. If insufficient torque is developed, gearing 40 may be provided between the shaft 30 and the race member.

Thus, rotational movement of the race member 20 causes rotation of the blades 10.

In an embodiment, the rotation of the race member may be caused by a hydraulic motor. In a preferred embodiment, however, rotation is caused by an electric motor.

Figure 4:
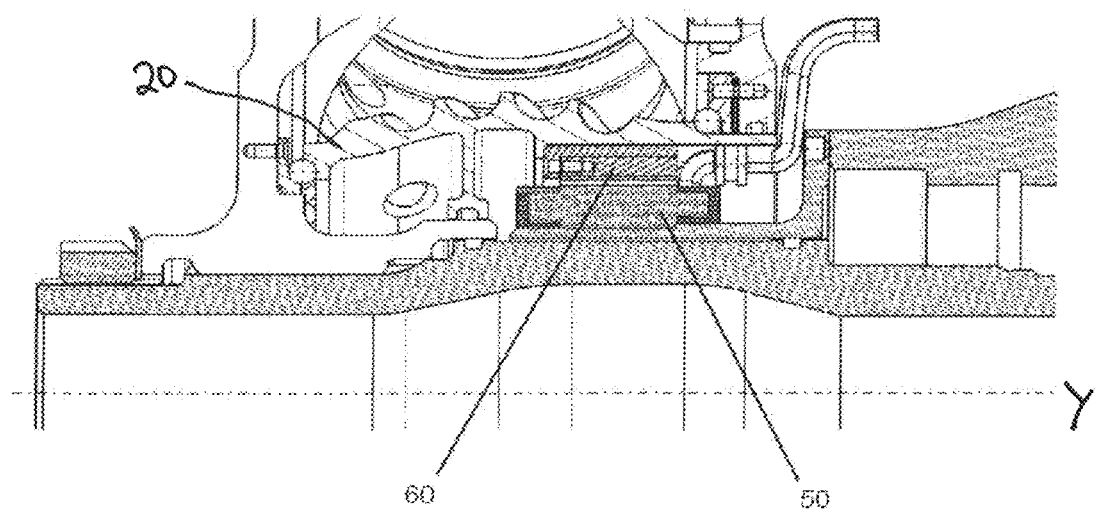
FIG. 4 is a sectional view showing an electric motor according to one embodiment of the disclosure.
Figure 5:
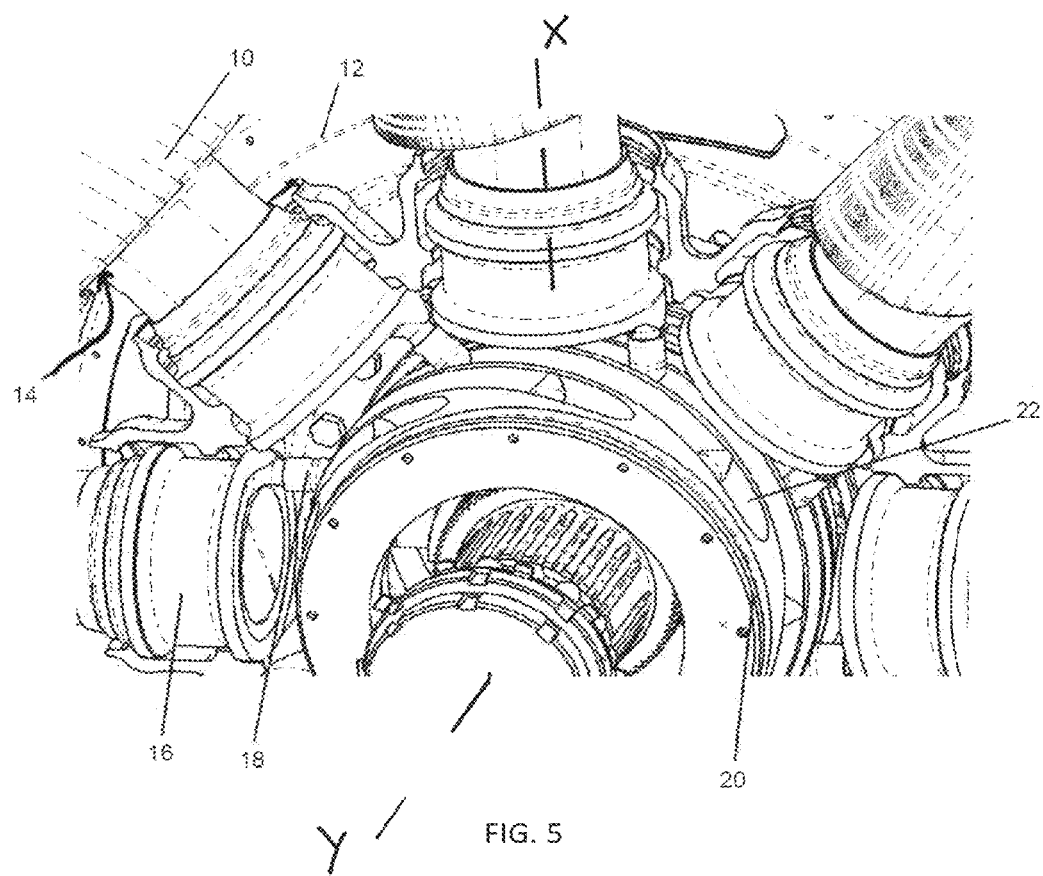
FIG. 5 shows a blade pitch actuation mechanism for rotating blades of a propeller.

A preferred arrangement of an electric motor to rotate the race member 20 can be best seen in FIG. 4. The electric motor could have an axial or a radial magnetic flux arrangement. The electric motor shown in the example comprises a stator 50 and a rotor 60 that together create a flux causing rotation of the rotor and, thus, drive rotation of the race member. For safety purposes, the electrical motor can be duplicated.

In the preferred embodiment, the stator 50 is mounted on a stationary part of the propeller shaft 30. In this way, the need for a device for electric power transmission between the static and the rotating part, e.g. brush blocks and slip rings, can be avoided.

The speed of the electric motor and the propeller are the same. When an external perturbation, such as a gust, occurs, the propeller speed can increase or decrease, the speed of the electric motor is set and does not change (in cruise phase for example). Due to these differential rotating speeds, the hub, blade and trunnion pin run into the races and modify the blade pitch to re-adjust the propeller speed.

A problem with existing hydraulic systems is that if the hydraulic power fails, the blades will move due to the effect of the airstream and/or the weight distribution of the blades themselves. The blades will naturally take a low pitch position. To prevent this in existing systems, complex bearing feathering mechanisms are required. More specifically, for safety, in the event of power failure, the blades must locate in a feathering position. Currently, for this, a counterweight is added to the blade to force the blade to the feathering position due to centrifugal load. With the design of the present disclosure, this function will be ensured due to the shape of the race. In the case of electrical failure, the motor will act as a brake and the trunnion pin will slide on the race to cause feathering of the blades.

In a preferred embodiment, the electric motor is a brushless motor, with radial or axial magnetic flux and with the coil stator on a non-rotating part of the propeller shaft. This allows the motor to be easily fitted to the assembly.

The blade pitch actuation mechanism of this disclosure provides a light, simple system having fewer component parts. The cam itself causes feathering of the blades in the event of power loss, without the need for additional complex mechanisms. The pitch can be easily regulated during cruise and climb conditions. Maintenance is simplified by the motor being arranged to be easily 'plugged in'.

Whilst mainly described in the context of aircraft propellers, the concepts described herein can be equally applied to other rotating blade systems.

The invention claimed is:

1. A propeller system comprising:
a plurality of blades arranged around a hub rotatable about a hub axis (Y), each blade extending radially from the hub along a blade axis (X) and having an inner end received in a coupling having an associated trunnion pin configured such that rotation of the trunnion pin about the blade axis (X) causes pitch change of the blade relative to the blade axis (X); and
a blade pitch actuation mechanism comprising:
a rotating race member mounted within the hub, the member having a helical race slot formed in it and configured to receive the trunnion pins of the blades and to rotate about the hub axis (Y) relative to the trunnion pins,
whereby the helical race slot has a cammed inner profile such that rotation of the race member about the hub axis causes the trunnion pins received in the race to rotate about the blade axis as the trunnion pins slide over the cammed inner profile.

2. The propeller system as claimed in claim 1, whereby the race member is caused to rotate by an electric drive.

3. The propeller system as claimed in claim 2, wherein the electric drive comprises a stator and a rotor.

4. The propeller system-as claimed in claim 3, wherein the stator of the electric drive is mounted on a non-rotating part of the mechanism.

5. A method of adjusting the pitch of a blade in a propeller system as recited in claim 1, the method comprising:
rotating the rotating race member about the hub axis, the inner cammed profile being such as to rotate the trunnion pins about their owns axes as the cammed inner profile rotates.

* * * * *